United States Patent

[11] 3,590,897

| [72] | Inventor | Edwin C. Bragdon<br>5445 Val Verde St., Houston, Tex. 77027 |
|---|---|---|
| [21] | Appl. No. | 868,042 |
| [22] | Filed | Oct. 21, 1969 |
| [45] | Patented | July 6, 1971 |

[54] SPIDER WHEEL
2 Claims, 11 Drawing Figs.

[52] U.S. Cl. .................................................. 152/12,
305/1, 180/7
[51] Int. Cl. ...................................................... B60b 9/04,
B62d 57/00
[50] Field of Search ........................................... 152/336,
11, 12, 14, 74, 80; 301/38, 41, 5; 305/1; 180/7

[56] References Cited
UNITED STATES PATENTS

| 603,710 | 5/1898 | Sewell | 152/336 |
|---|---|---|---|
| 1,309,540 | 7/1919 | Oldham | 152/14 |
| 1,618,949 | 2/1927 | Reid | 180/7 |
| 3,208,544 | 9/1965 | Colvin | 301/5 |

FOREIGN PATENTS

| 565,736 | 11/1944 | Great Britain | 180/7 |
|---|---|---|---|

*Primary Examiner*—Arthur L. La Point
*Assistant Examiner*—D. W. Keen

ABSTRACT: A soft resilient wheel having a multiple number of radial elements of springing material in order to cushion a vehicle and also properly support the vehicle upon various types of surfaces.

PATENTED JUL 6 1971 3,590,897

INVENTOR.
EDWIN C. BRAGDON

PATENTED JUL 6 1971

INVENTOR.
Edwin C. Bragdon

INVENTOR.
EDWIN C. BRAGDON

SPIDER WHEEL

This invention relates to wheels for vehicles, and more particularly to a soft resilient wheel.

It is therefore the main purpose of this invention to provide a spider wheel for all types of vehicles which will enable them to travel safely upon various types of terrain.

Another object of this invention is to provide a spiderlike wheel which may be readily adaptable to aircraft, artillery and the like while also being suitable for trackless vehicles.

A further object of this invention is to provide a spider wheel which will have a plurality of radial elements mounted upon resilient members which will appropriately absorb shock thus reducing vibration as is normally encountered in various types of vehicles.

Other objects of the present invention are to provide a spider wheel which is simple in design, inexpensive to manufacture, rugged in construction, easy to use and efficient in operation.

These and other objects will become readily evident upon a study of the following specification and the accompanying drawings wherein.

Figure 1:
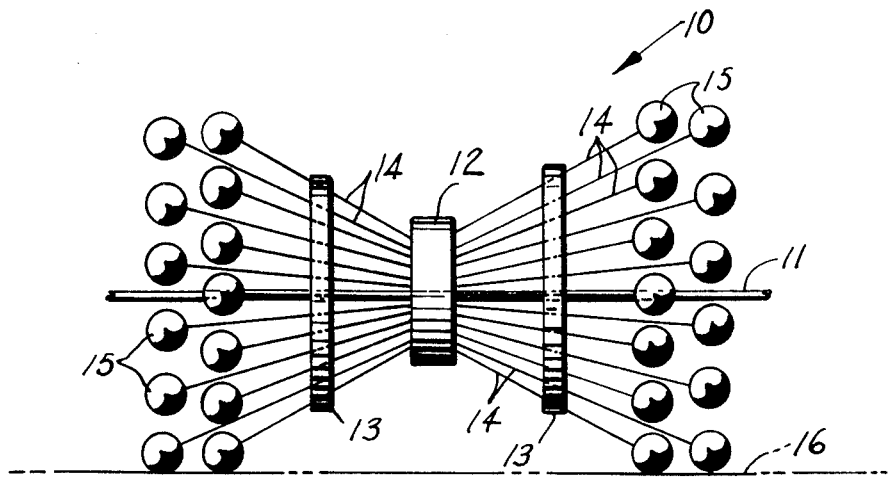
FIG. 1 is a horizontal view of the present invention.
Figure 2:
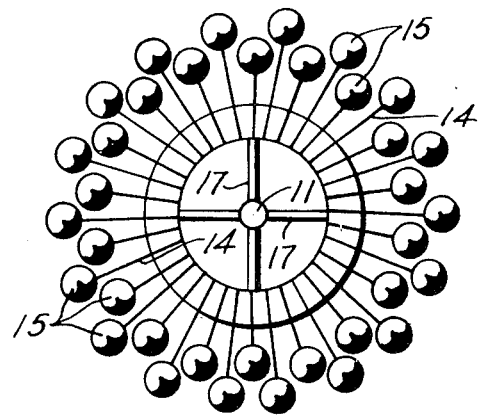
FIG. 2 is a side view of FIG. 1 shown in elevation.

According to this invention, a spider wheel 10 is shown to include an axle 11 to which is attached fixedly a central member 12 of circular configuration. Spaced apart on each side of the central member 12 are circular members 13 forming hub supports for radially spaced-apart spring members 14 which are carried within circular members 13.

The outer extremities of radial members 14 are fixedly secured spherical balls 15 which engage with ground 16.

It shall be noted that on either side of spider wheel 10 the balls 15 secured to the ends of radial members 14 are arranged in tiers. This arrangement allows for the greatest lateral support while maintaining the maximum softness the vehicle wheel 10 may be secured to.

Wheel 10 is also provided with a plurality of radial spokes for properly supporting the circular members 13.

Figure 3:
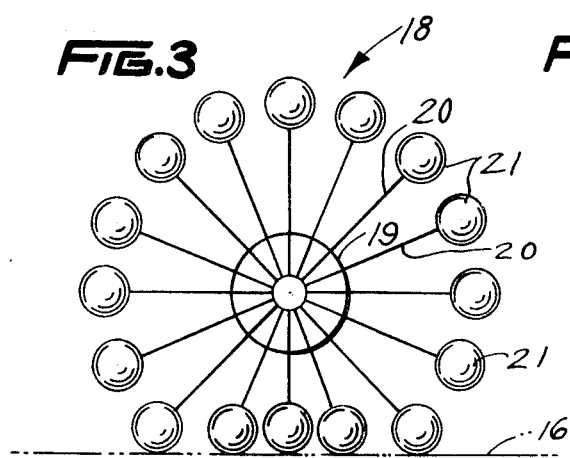
FIG. 3 is a side view showing a modified form of the invention.

Looking now at FIG. 3 of the drawings, one will see a wheel 18 having a hub member 19 with a plurality of radially spaced-apart spring members 20, the outer ends of which are secured fixedly to balls 21.

Figure 10:
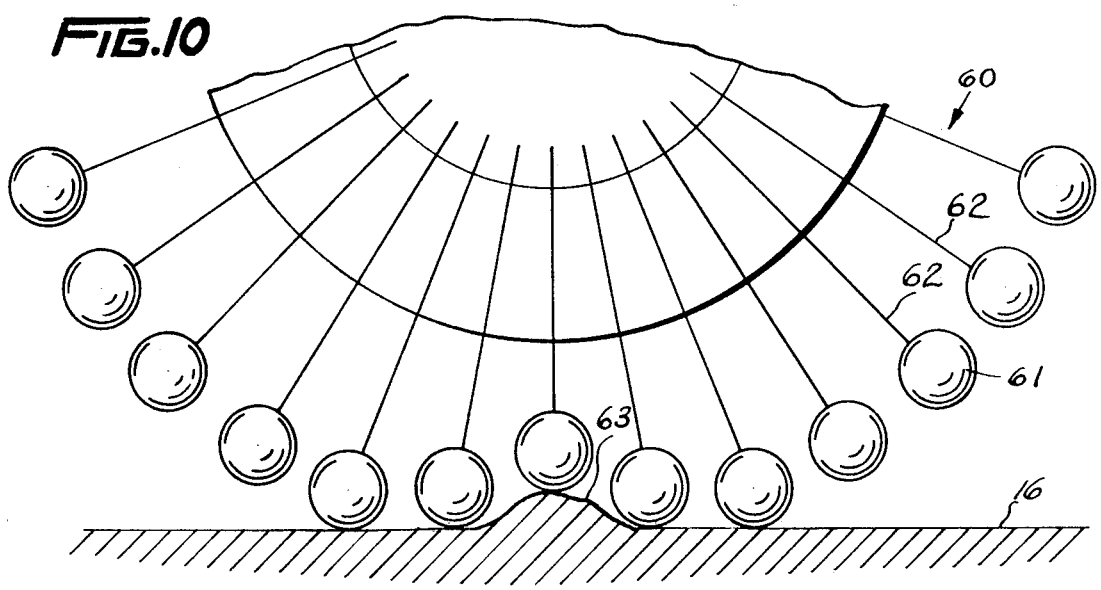
Figure 11:
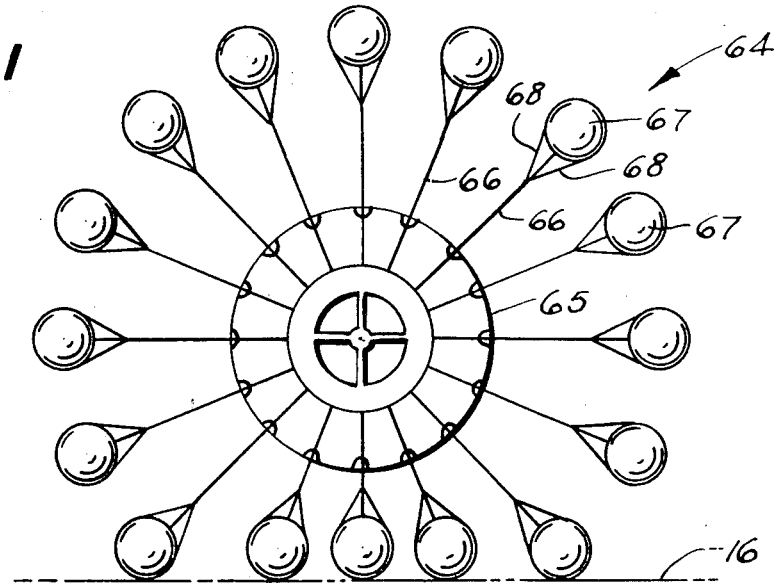

It shall also be noted that FIGS. 3, 10 and 11 serve to illustrate traction that occurs under a normal loading condition with the various forms of the present invention.

It shall further be noted that FIG. 10 of the drawings illustrates how the invention maintains a maximum amount of traction over a rough surface.

Figure 4:
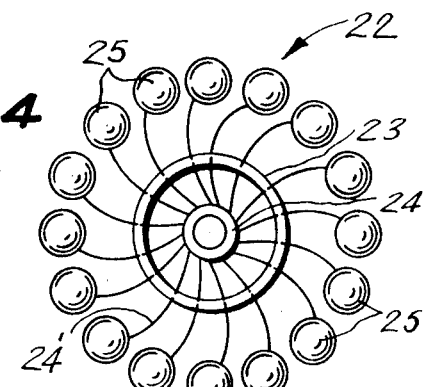
FIG. 4 is a side view showing another modified form of the invention.

Looking now at FIG. 4 of the drawing, one will see a wheel of modified form having a circular ring type hub 23 encompassing a hub 24, the ring 23 supporting a plurality of radially spaced apart and arcuately configurated spring members 24' to which are fixedly secured balls 25 which serve to resiliently contact ground 16.

Figure 5:
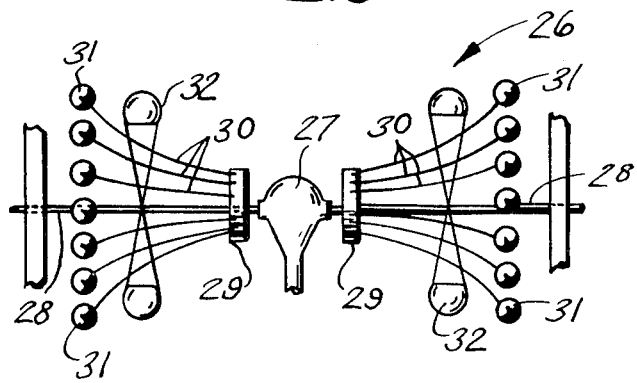
FIGS. 5, 6, 7, 8, 9, 10 and 11 show still other modified forms of the invention.

In FIG. 5 of the drawings, one will see a modified form of spider wheels 26 which are connected to a differential 27 from which extends axles 28. Axles 28 carry hub members 29 from which extend arcuately configurated spring members 30 having attached balls 31 for contact with ground 16. The radial spring members 30 are also supported by members 32 following a secondary ground contact.

Figure 6:
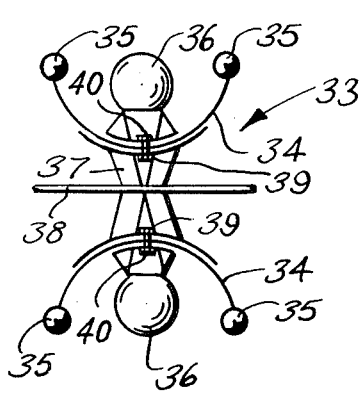

Another modified form of wheel 33, as shown in FIG. 6 of the drawings, includes a portion of semicircular leaf springs 34 to which are attached at each end balls 35 and a secondary ground contact member 36 is secured to springs 34 and hub 37 upon axle 38 by means of a plurality of bolts 39 and nut fasteners which prevent side play within wheels 33.

Figure 7:
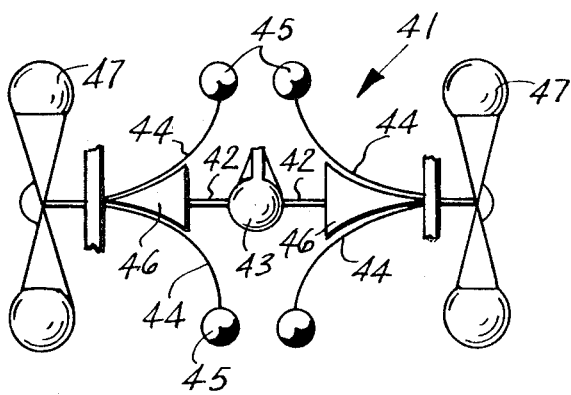

Looking at FIG. 7 of the drawing, one will see another modified form of wheels secured to axles 42 extending from differential 43. Wheels 41 include a plurality of arcuate spring members, the ends having balls 45 which may be retracted when not in use.

Springs 44 engage with conical members 46 upon axles 42 and wheels 41 include outer traction members 47.

Figure 8:
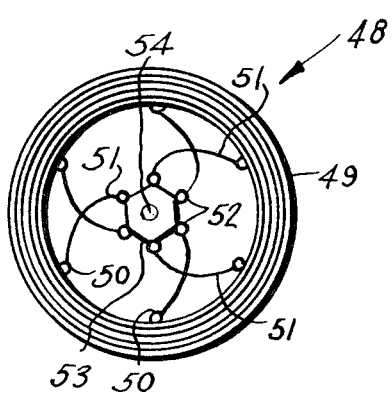

In FIG. 8 of the drawing, one will see another modified form of wheel comprising a resilient and flexible ring 49 having a plurality of lugs to which are secured a plurality of arcuate spring members, the other ends of spring members 51 being secured to lugs 52 of a hexagonal hub 53, hub 53 receiving the axle.

Figure 9:
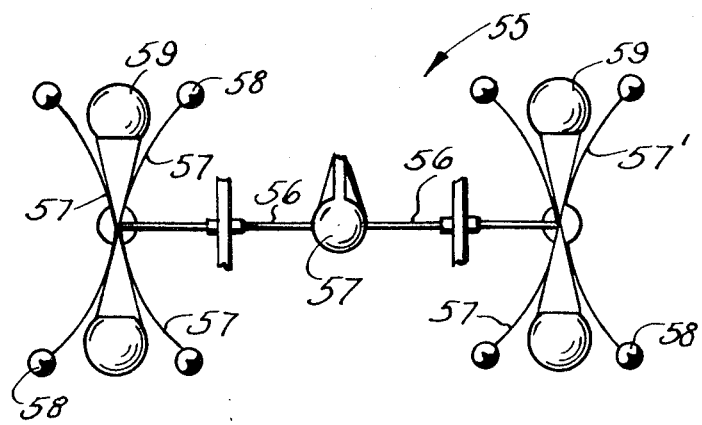

In FIG. 9 of the drawings, one will see another modified form of wheel 55 secured to axle 56 of differential 57. Wheels 55 consist of a plurality of arcuately configurated spring members 57' having balls 58 attached to their ends for ground contact and in the center of wheels 55 is a secondary ground contact element 59 which is substantially disposed between balls 58.

Still another modified form of wheel 60 is shown to include a plurality of radially spaced-apart balls 61 secured fixedly to the ends of leaf springs 62 and the balls 61 ride over the raised portion 63 of ground 16, as shown in FIG. 10.

A still further modified form of wheel 64 is shown to include a spoked hub 65 from which extends spring members 66 having balls 67 attached to the ends thereof.

The balls 67 are supported by additional support members 68.

In use, the herein disclosed invention is constructed so as to be of minimum in weight and will not blow out as ordinary tires and will have a low center of gravity which becomes lower when pulling or breaking the heretofore described wheels. The wheels have the inherent tendency to absorb most of the surface friction and the herein wheels are adaptable to almost any terrain by each of the radial elements bending and absorbing the shock of ridges and the like.

What I now claim is:

1. A resilient spiderlike wheel comprising an axle having mounted thereon a central member and a pair of hub members, said hub members spaced from said central member, a plurality of radially spaced-apart leaf spring members attached at one end to and extending from said central member through said hub members, and ball members carried on free ends of said leaf spring members for engagement with the surface over which the wheel travels.

2. The combination according to claim 1 wherein said balls are spaced radially and longitudinally apart along said axle in order to form a circular geometric pattern when wheel is not under load.